US009417373B2

(12) United States Patent
Kim et al.

(10) Patent No.: US 9,417,373 B2
(45) Date of Patent: Aug. 16, 2016

(54) DISPLAY DEVICE

(71) Applicant: Samsung Display Co., Ltd., Yongin, Gyeonggi-Do (KR)

(72) Inventors: Seul-Gi Kim, Seoul (KR); Donghyeon Lee, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 300 days.

(21) Appl. No.: 14/164,392

(22) Filed: Jan. 27, 2014

(65) Prior Publication Data

US 2015/0043244 A1 Feb. 12, 2015

(30) Foreign Application Priority Data

Aug. 9, 2013 (KR) .................. 10-2013-0094922

(51) Int. Cl.
*F21V 8/00* (2006.01)

(52) U.S. Cl.
CPC ............ *G02B 6/0031* (2013.01); *G02B 6/0025* (2013.01); *G02B 6/0091* (2013.01); *Y10T 29/49826* (2015.01)

(58) Field of Classification Search
CPC ..................... G02B 6/0031; G02B 6/0025
See application file for complete search history.

(56) References Cited

U.S. PATENT DOCUMENTS 5,390,276 A * 2/1995 Tai ................. G02B 6/0036
362/561

FOREIGN PATENT DOCUMENTS

| JP | 08161918 A | 6/1996 |
|---|---|---|
| JP | 2002133928 B2 | 5/2002 |
| JP | 2008003128 A | 1/2008 |
| JP | 2012094283 A | 5/2012 |
| KR | 1020030037700 A | 5/2003 |
| KR | 1020070069320 A | 7/2007 |
| KR | 1020080029351 A | 4/2008 |
| KR | 1020080080764 A | 9/2008 |
| KR | 1020110094803 B1 | 8/2011 |

* cited by examiner

*Primary Examiner* — David V Bruce
(74) *Attorney, Agent, or Firm* — Cantor Colburn LLP

(57) ABSTRACT

A display device includes a light guide unit, a light source, a display panel and a protective member. The light guide unit includes a first surface, a second surface facing the first surface, and a plurality of connecting surfaces connecting the first surface and the second surface to each other, and guides a light which is incident to a connecting surface to the first surface. The light source provides light to the connecting surface. The display panel displays an image using the light provided from the first surface of the light guide unit. The protective member includes a plurality of reflective patterns facing another connecting surface among the plurality connecting surfaces, provides the light leaked from the light guide unit to the another connecting surface, and accommodates the light guide unit, the light source and the display panel therein.

18 Claims, 17 Drawing Sheets

DISPLAY DEVICE

This application claims priority to Korean Patent Application No. 10-2013-0094922, filed on Aug. 9, 2013, and all the benefits accruing therefrom under 35 U.S.C. §119, the contents of which are hereby incorporated by reference in its entirety.

BACKGROUND

1. Field

The invention relates to a display device. More particularly, the invention relates to a display device having improved light efficiency.

2. Description of the Related Art

In general, a display device is classified into a transmissive type display device, a transflective type display device and a reflective type display device. Each of the transmissive type and transflective type display devices includes a display panel to display an image and a backlight unit to provide light to the display panel.

The backlight unit includes a light source to generate the light and a light guide unit to guide the light from the light source to the display panel.

SUMMARY

One or more exemplary embodiment of the invention provides a display device capable of reflecting a light leaked from a light guide unit back to the light guide unit, to improve light efficiency of the display device.

Exemplary embodiments of the invention provide a display device including a light guide unit, a light source providing a light to the light guide unit, a display panel displaying an image using the light from the light guide unit, and a protective member accommodating the light guide unit, the light source and the display panel therein.

The light guide unit includes a first surface, a second surface facing the first surface, and a plurality of connecting surfaces connecting the first surface and the second surface to each other, and guides the light incident to a connecting surface of the connecting surfaces, to the first surface.

The protective member includes a plurality of reflective patterns facing another connecting surface of the connecting surfaces, and providing light leaked from the light guide unit to the another connecting surface.

The reflective patterns may be extended in a direction normal to the first surface. A reflective pattern may include a reflective surface extended in the direction normal to the first surface to reflect the light leaked from the light guide unit.

The reflective pattern may have a prism shape including a first reflective surface and a second reflective surface, which form an acute angle.

The reflective patterns may be arranged in a direction in which the another connecting surface is extended.

The reflective patterns may be spaced apart from the another connecting surface.

The another connecting surface may include remaining connecting surfaces of the connecting surfaces except for the connecting surface to which the incident light is incident.

The protective member may include a lower protective member facing the second surface, an intermediate protective member supporting the display panel, partially covering the first surface and including a portion facing the another connecting surface, and an upper protective member partially covering the display panel. The reflective patterns are on the portion of the intermediate protective member.

Exemplary embodiments of the invention provide a display device including a light source which emits an incident light, a light guide unit which includes a first surface, a second surface facing the first surface, and a plurality of connecting surfaces connecting the first surface and the second surface, and outputs the incident light which is incident thereto through a connecting surface of the connecting surfaces, through the first surface, and a display panel which displays an image using the incident light from the first surface, a protective member which accommodates the light guide unit, the light source and the display panel, and a reflective member which faces another connecting surface of the connecting surfaces, provides light leaked from the light guide unit to the another connecting surface, and is coupled to the protective member.

The protective member and the prism sheet may be coupled to each other by an adhesive. The reflective member may include a prism sheet including a plurality of prism pattern.

According to one or more exemplary embodiment, the light incident to the light guide unit is partially leaked through a connecting surface of the light guide unit. The light leaked through the connecting surface may be reflected by the reflective patterns and re-incident to the connecting surface. Therefore, the amount of the light incident to the display panel is increased, and the light efficiency of the display device may be improved.

The leaked light reflected by the reflective patterns having the prism shape may be easily incident to the connecting surface. The reflective patterns having the prism shape provide an optical path to form a relatively larger incident angle against the connecting surface.

BRIEF DESCRIPTION OF THE DRAWINGS

The above and other advantages of the invention will become readily apparent by reference to the following detailed description when considered in conjunction with the accompanying drawings in which.

DETAILED DESCRIPTION

Figure 1:
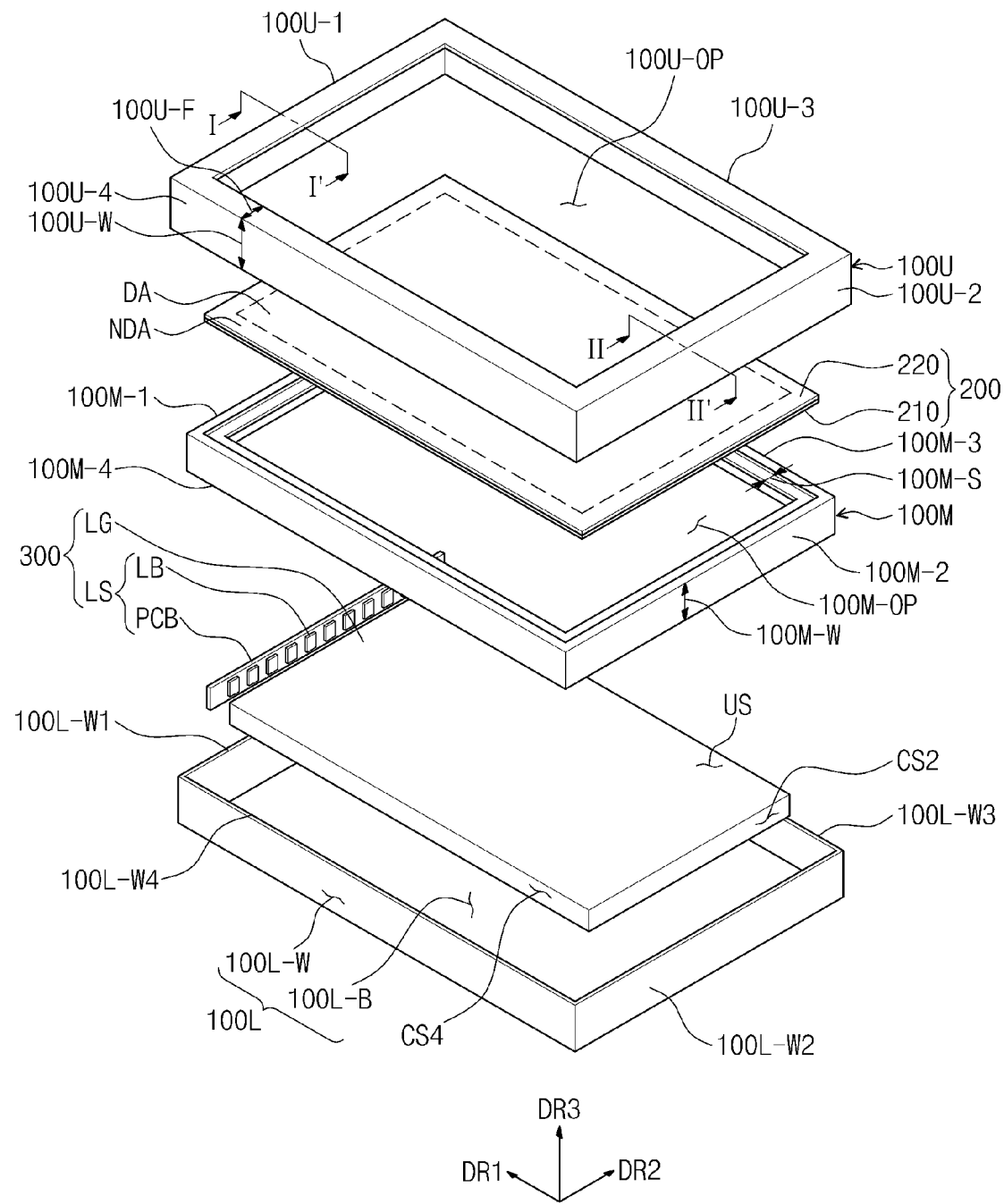
FIG. 1 is an exploded perspective view showing an exemplary embodiment of a display device according to the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" other elements or features would then be oriented "above" the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including, when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

Figure 2:
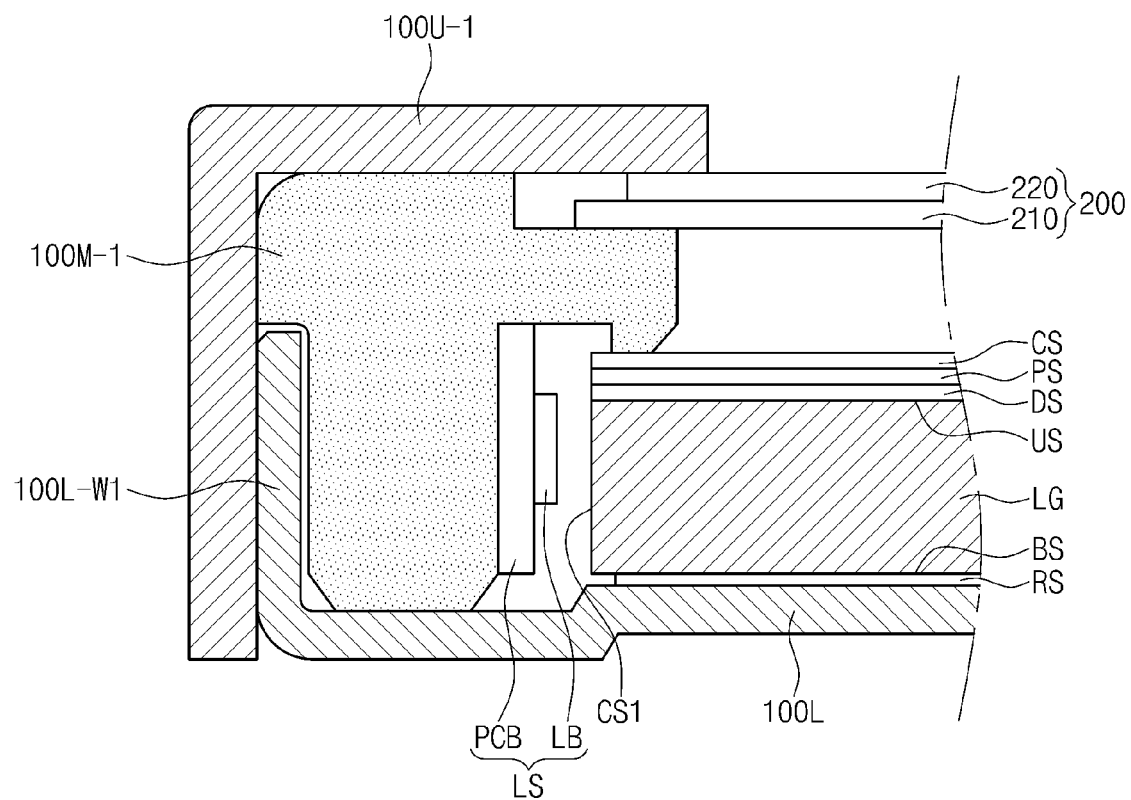
FIG. 2 is a cross-sectional view taken along line I-I' shown in FIG. 1.
Figure 3:
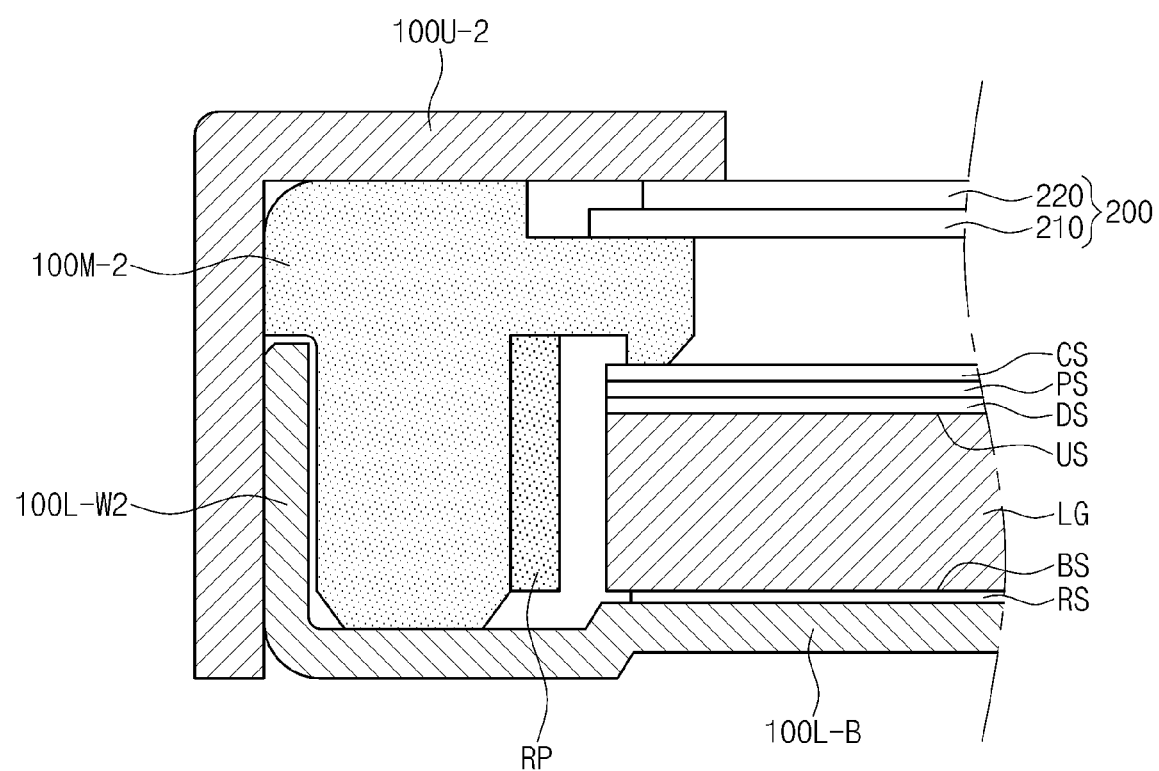
FIG. 3 is a cross-sectional view taken along line II-IP shown in FIG. 1.

FIG. 1 is an exploded perspective view showing an exemplary embodiment of a display device according to the invention, FIG. 2 is a cross-sectional view taken along line I-I' shown in FIG. 1, and FIG. 3 is a cross-sectional view taken along line II-IP shown in FIG. 1. FIGS. 2 and 3 show the cross-sectional views of an assembled state of the display device shown in FIG. 1.

Referring to FIGS. 1 to 3, a display device includes protective members 100U, 100M and 100L, a display panel 200 and a backlight unit 300. The display device is a transmissive or transflective type display device that displays an image using a light provided from the backlight unit 300.

The protective members 100U, 100M and 100L include an upper protective member 100U and a lower protective member 100L, which are coupled to each other. The upper protective member 100U and the lower protective member 100L form an outer surface of the display device and accommodate other components of the display device therein.

The upper protective member 100U is disposed on the display panel 200. An opening portion 100U-OP is formed through the upper protective member 100U includes an to expose a portion of the display panel 200, e.g., a display area DA in which the image is displayed. The upper protective member 100U covers a non-display area NDA of the display panel 200. The non-display area NDA is disposed adjacent to the display area DA and the image is not displayed in the non-display area NDA.

For instance, the upper protective member 100U has a rectangular frame shape when viewed in a plan view. The upper protective member 100U includes four parts 100U-1 to 100U-4. The four parts 100U-1 to 100U-4 may be integral with each other to form single, unitary and indivisible upper protective member 100U, or may be separate elements which are assembled to each other to form the upper protective member 100U. Each of the four parts 100U-1 to 100U-4 includes a sidewall portion 100U-W providing the outer surface of the display device and a front surface portion 100U-F bent from the sidewall portion 100U-W. The opening portion 100U-OP is defined by the front surface portions 100U-F of the four parts 100U-1 to 100U-4.

The lower protective member 100L is disposed under the display panel 200. The lower protective member 100L includes a bottom portion 100L-B and a sidewall portion 100L-W bent upward from the bottom portion 100L-B.

In detail, the bottom portion 100L-B has a rectangular shape. The sidewall portion 100L-W is extended such as to be bent from four sides of the bottom portion 100L-B. The sidewall portion 100L-W includes four parts 100L-W1 to 100L-W4 respectively corresponding to the four sides of the bottom portion 100L-B. The four parts 100L-W1 to 100L-W4 are integral with each other and form a single, unitary and indivisible unit. This integral unit may be further integral with the bottom portion 100L-B, but the invention is not limited thereto. According to another exemplary embodiment, the four parts 100L-W1 to 100L-W4 may be separate elements from each other which are assembled to form the sidewall portion 100L-W of the lower protective member 100L.

The protective members 100U, 100M and 100L include an intermediate protective member 100M. The intermediate protective member 100M is disposed between the upper protective member 100U and the lower protective member 100L. An opening portion 100M-OP is formed through the intermediate protective member 100M. The intermediate protective member 100M covers the backlight unit 300 and supports the display panel 200.

In detail, the intermediate protective member 100M has a rectangular frame shape to correspond to the non-display area NDA of the display panel 200. The intermediate protective member 100M includes four parts 100M-1 to 100M-4. The four parts 100M-1 to 100M-4 may be integral with each other to form single, unitary and indivisible intermediate protective member 100M, or may be separate elements which are assembled to each other to form the intermediate protective member 100M.

Each of the four parts 100M-1 to 100M-4 includes a sidewall portion 100M-W accommodated in the lower protective member 100L and a support portion 100M-S connected to the sidewall portion 100M-W to support the display panel 200. An inner surface of the sidewall portion 100L-W of the lower protective member 100L faces an outer surface of the sidewall portion 100M-W of the intermediate protective member 100M.

The display panel 200 receives the light from the backlight unit 300. The display panel 200 may be, but not limited to, a liquid crystal display panel, an electrophoretic display panel or an electrowetting display panel. In the illustrated exemplary embodiment, the liquid crystal display panel will be described as the display panel 200, and thus the display panel 200 includes a first substrate 210, a second substrate 220, and a liquid crystal layer (not shown) interposed between the first and second substrates 210 and 220.

The backlight unit 300 includes a light source LS to generate and emit the light, and a light guide unit LG to guide the light from the light source LS to the display panel 200.

The light source LS includes a circuit board PCB, and a plurality of light emitting sources LB mounted on the circuit board PCB. Although not shown in figures, the circuit board PCB includes at least one insulating layer and at least one circuit layer. The circuit layer includes wirings to apply a voltage to the light emitting devices LB. The light emitting devices LB may include point light sources, but the invention is not limited thereto.

The light guide unit LG is disposed under the display panel 200. The light guide unit LG includes a first surface US, a second surface BS, and a plurality of connecting surfaces to connect the first surface US and the second surface BS. The light guide unit LG has a rectangular plate shape.

The connecting surfaces are configured to include two connecting surfaces facing each other in a first direction DR1 and two connecting surfaces facing each other in a second direction DR2 substantially perpendicular to the first direction DR1. FIG. 1 shows only two connecting surfaces CS2 and CS4 among the connecting surfaces.

One connecting surface of the two connecting surfaces facing each other in the first direction DR1 faces the light emitting devices LB. The connecting surface facing the light emitting devices LB will be referred to as a light incident surface CS1 (refer to FIG. 2). The other one of the two connecting surfaces facing each other in the first direction DR1 will be referred to as an opposite surface CS2.

In the illustrated exemplary embodiment, the two connecting surfaces facing each other in the second direction DR2 will be respectively referred to as a first side surface CS3 (refer to FIG. 5) and a second side surface CS4. Each of the first and second side surfaces CS3 and CS4 connects the light incident surface CS1 and the opposite surface CS2 to each other. According to another exemplary embodiment, the light guide unit LG may further include additional connecting surfaces except for the first and second side surfaces CS3 and CS4.

Hereinafter, the four parts 100M-1 to 100M-4 of the intermediate protective member 100M are defined with reference to the light guide unit LG. The four parts 100M-1 to 100M-4 are respectively referred to as a first part 100M-1 corresponding to the light incident surface CS1, a second part 100M-2 corresponding to the opposite surface CS2, a third part 100M-3 corresponding to the first side surface CS3, and a fourth part 100M-4 corresponding to the second side surface CS4. As described below, the sidewall portions 100M-W of the first to fourth parts 100M-1 to 100M-4 face the connecting surfaces CS1 to CS4 of the light guide unit LG, respectively.

The light incident to the light guide unit LG through the light incident surface CS1 exits through the first surface US. The first surface US faces the display panel 200. The second surface BS faces the first surface US in a normal line direction DR3 (hereinafter, referred to as third direction DR3) to the first surface US. The second surface BS faces the bottom portion 100L-B of the lower protective member 100L.

The display device may further include an optical sheet and a reflective sheet in order to improve the efficiency of the light provided to the display panel 200. The optical sheet is disposed between the first surface US of the light guide unit LG and the display panel 200.

The optical sheet includes a diffusion sheet DS, a prism sheet PS, and a protective sheet CS. The diffusion sheet DS diffuses the light exiting from the first surface US of the light guide unit LG. The prism sheet PS condenses the light diffused by the diffusion sheet DS in a direction vertical to the display panel 200. The protective sheet CS protects the prism sheet PS. The diffusion sheet DS, the prism sheet PS, and the protective sheet CS include a transparent material.

The reflective sheet RS is disposed under the light guide unit LG. The reflective sheet RS reflects the light leaked from the light guide unit LG through the second surface BS to allow the leaked light to be re-incident to the light guide unit LG through the second surface BS.

Figure 4:
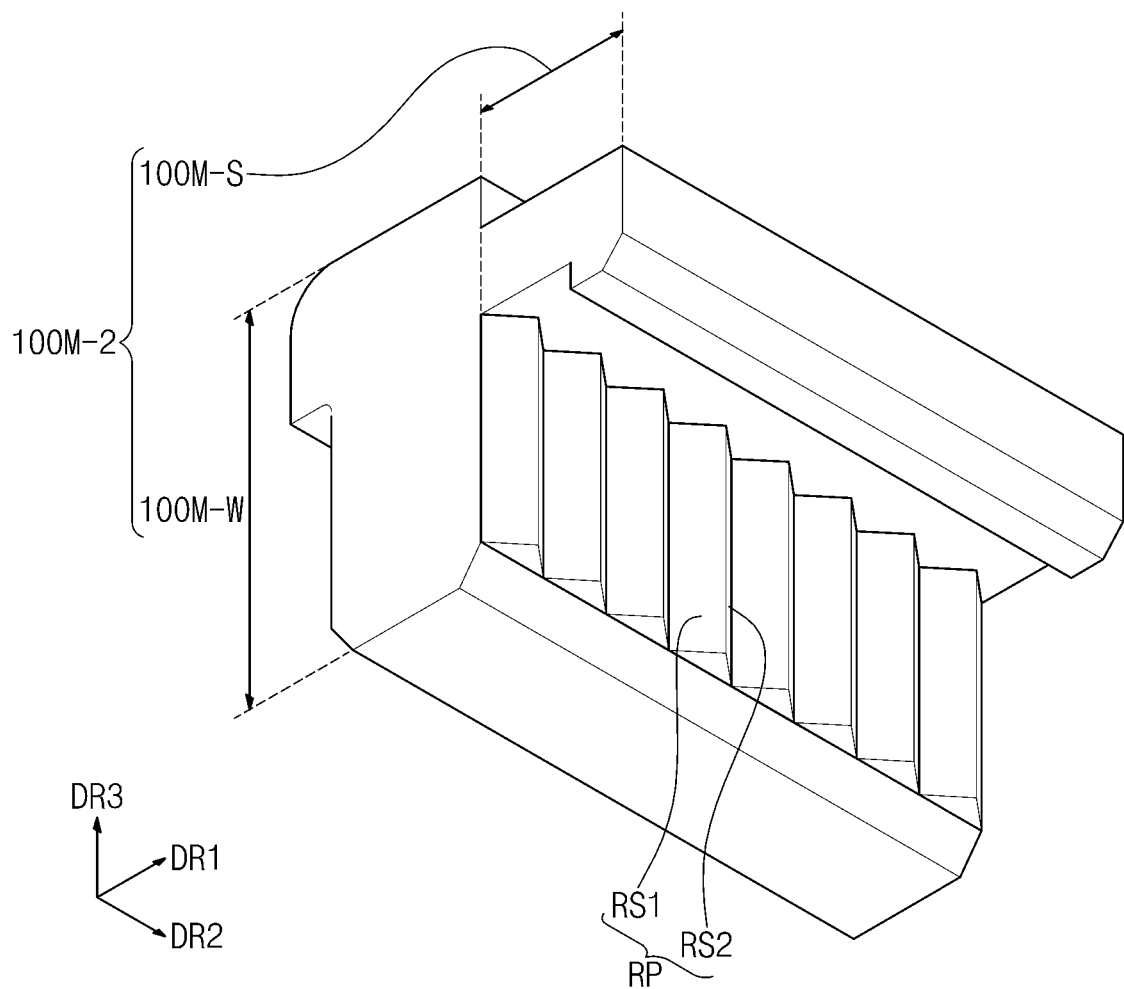
FIG. 4 is a perspective view showing an exemplary embodiment of reflective patterns according to the invention.

FIG. 4 is a perspective view showing an exemplary embodiment of reflective patterns according to the invention. FIG. 4 shows the second part 100M-2 of the intermediate protective member 100M, which faces the opposite surface CS2 of the light guide unit LG (refer to FIG. 1).

The display device includes a plurality of reflective patterns RP. The reflective patterns RP face at least one of the opposite surface CS2, the first side surface CS3 and the second side surface CS4 of the light guide unit LG. The reflective patterns RP reflect the light leaked from the light guide unit LG to the opposite surface CS2, the first side surface CS3 and the second side surface CS4.

The reflective patterns RP may be disposed on the intermediate protective member 100M. In detail, the reflective patterns RP may be disposed on the inner surface of the sidewall portion 100M-W of the second, third and/or fourth parts 100M-2, 100M-3 and 100M-4 respectively corresponding to the opposite surface CS2, the first side surface CS3 and the second side surface CS4 of the light guide unit LG.

According to an exemplary embodiment of a method of manufacturing the intermediate protective member 100M, the inner surface of the sidewall portion 100M-W may be formed to have the function of the reflective patterns RP. That is, the intermediate protective member 100M may include the reflective patterns RP as an integral portion thereof. To this end, the intermediate protective member 100M may be manufactured by an injection molding method. The injection molded the intermediate protective member 100M may include a synthetic resin.

However, the display device may include the reflective patterns RP facing only one of the connecting surfaces of the light guide unit LG. The reflective patterns RP may be disposed on other protective members among the protective members 100U, 100M and 100L rather than the intermediate protective member 100M. In an exemplary embodiment, for instance, when the display device does not include the intermediate protective member 100M, the reflective patterns RP may be disposed on the sidewall portion 100L-W of the lower protective member 100L.

In addition, FIG. 3 shows only the second part 100M-2 of the intermediate protective member 100M facing the opposite surface CS2 (refer to FIG. 1), but the reflective patterns RP may be selectively disposed on the inner surfaces of the third part 100M-3 and the fourth part 100M-4 of the intermediate protective member 100M.

As shown in FIG. 4, the reflective patterns RP are elongated to be extended in the third direction DR3. Each of the reflective patterns RP includes at least one reflective surface, e.g., reflective surfaces RS1 and RS2, to reflect the light leaked from the light guide unit LG. The reflective surfaces RS1 and RS2 are elongated to be extended in the third direction D3.

The reflective patterns RP are arranged in a direction in which a corresponding connecting surface of the connecting surfaces of the light guide unit LG is extended. As shown in FIG. 4, the reflective patterns RP are arranged in the second direction DR2 in which the opposite surface CS2 is extended.

In the plan view of the display device, each of the reflective patterns RP has a prism shape including the first reflective surface RS1 and the second reflective surface RS2, which form an acute angle with each other. A base of the prism shape from the first and second reflective surfaces RS1 and RS2 extend, may face the inner surface of the sidewall portion 100M-W. The shape of the reflective patterns RP determines an incidence rate of the leaked light against the connecting surface. This will be described in detail with reference to FIGS. 5 and 6.

Figure 5:
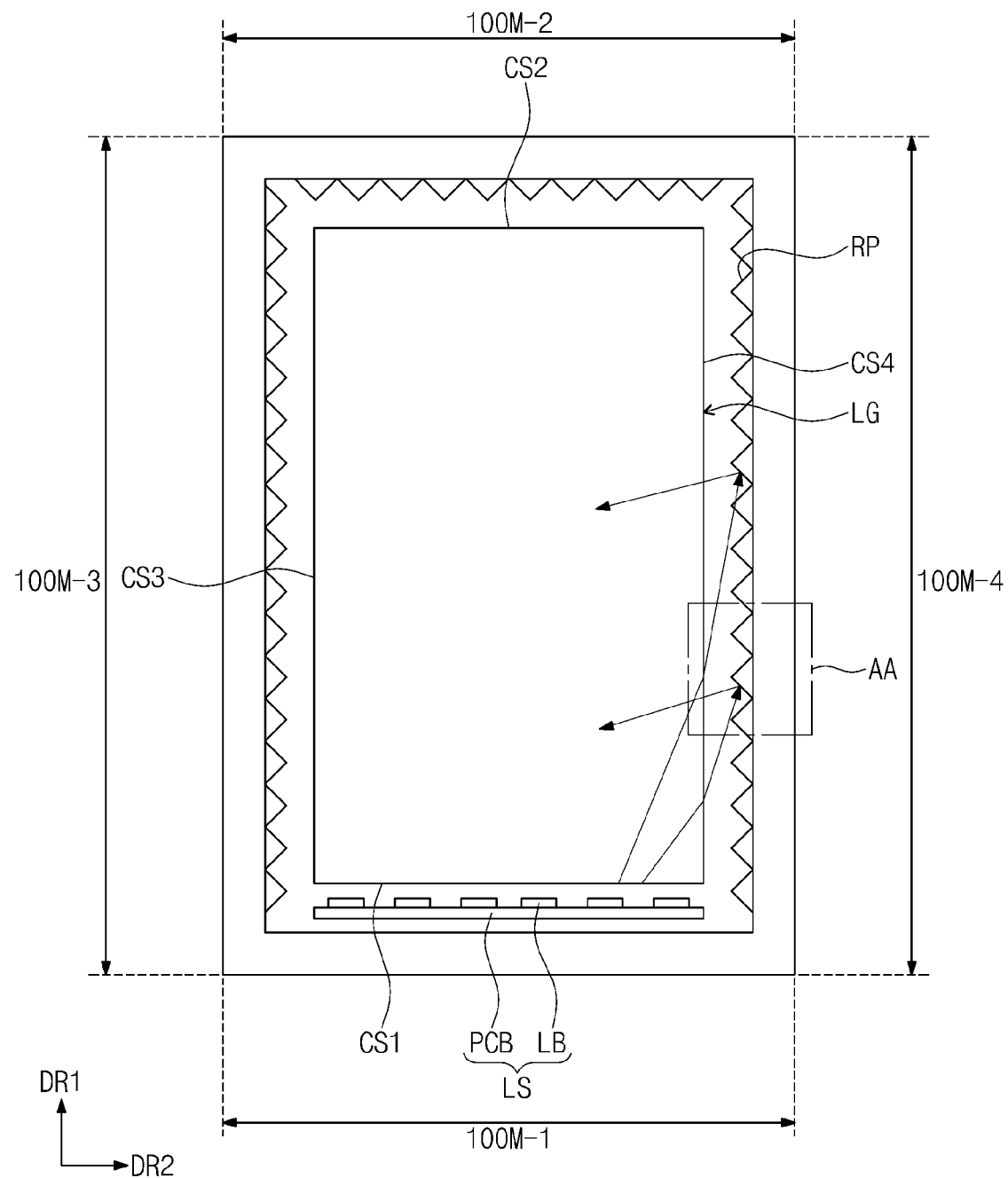
FIG. 5 is a plan view showing an exemplary embodiment of an arrangement relationship between a light guide unit and reflective patterns according to the invention.
Figure 6:
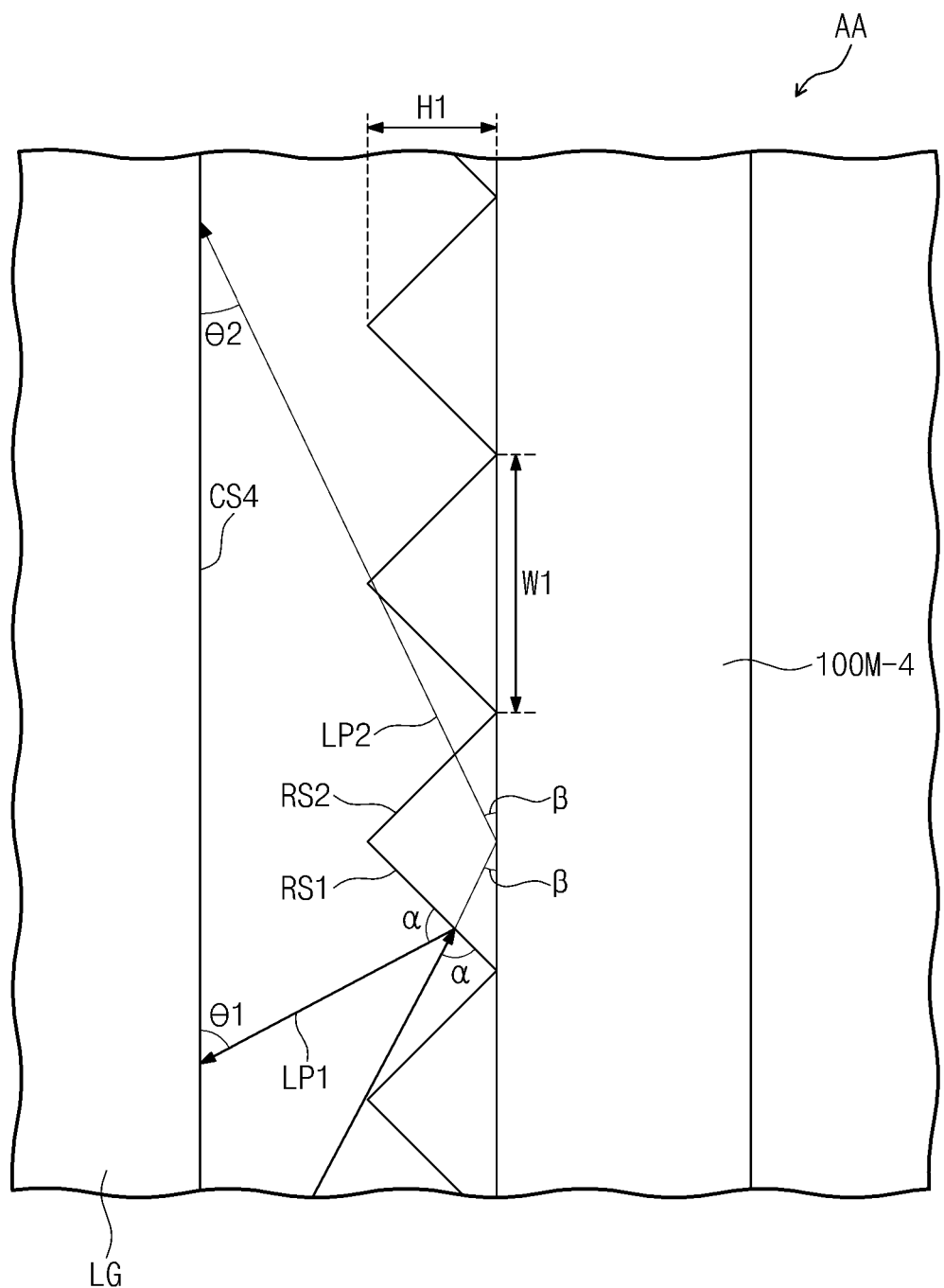
FIG. 6 is a partially enlarged view showing portion AA shown in FIG. 5.

FIG. 5 is a plan view showing an exemplary embodiment of an arrangement relationship between the light guide unit and the reflective patterns according to the invention and FIG. 6 is a partially enlarged view showing portion AA shown in FIG. 5.

Referring to FIG. 5, the reflective patterns RP are disposed on the second, third and fourth parts 100M-2, 100M-3 and 100M-4 of the intermediate protective member 100M, which respectively correspond to the opposite surface CS2, the first side surface CS3 and the second side surface CS4 of the light guide unit LG. The reflective patterns RP are spaced apart from the opposite surface CS2, the first side surface CS3 and the second side surface CS4 of the light guide unit LG. The reflective patterns RP are spaced apart from the light guide unit GL to reduce or effectively prevent the opposite surface CS2, the first side surface CS3 and the second side surface CS4 of the light guide unit LG from being damaged by the reflective patterns RP, such as by a distal end or apex of the prism shape of the reflectively patterns RP.

A portion of the light incident to the light incident surface CS1 is leaked through the second side surface CS4 of the light guide unit GL. The light leaked from the second side surface CS4 travels to the reflective patterns RP disposed on the fourth part 100M-4 of the intermediate protective member 100M. The light traveling to the reflective patterns RP disposed on the fourth part 100M-4 is reflected by the reflective patterns RP disposed on the fourth part 100M-4 and incident again to the second side surface CS4 of the light guide unit GL.

Referring to FIG. 6, the light, which is incident to the first reflective surface RS1 at a first incident angle α and reflected by the reflective patterns RP disposed on the fourth part 100M-4, is incident to the second side surface CS4 at a second incident angle θ1 along a first path LP1. The reflected light traveling along the first path LP1 has a reflective angle equal to the first incident angle α with respect to the first reflective surface RS1.

A second path LP2 indicates a direction in which the light incident to the plane inner surface of the fourth part 100M-4 travels, on which the reflective patterns RP do not exist. The light leaked through the second side surface CS4 is incident to the plane inner surface of the fourth part 100M-4 at a third incident angle β.

As shown in FIG. 6, the light, which is incident to the plane inner surface of the fourth part 100M-4 and reflected, is incident to the second side surface CS4 at a fourth incident angle θ2 along the second path LP2. The reflected light traveling along the second path LP2 has a reflective angle equal to the third incident angle β with respect to the plane inner surface of the fourth part 100M-4. The fourth incident angle θ2 may be substantially the same as the third incident angle β.

The light incident to the second side surface CS4 at the second incident angle θ1 enters into the light guide unit LG, but the light incident to the second side surface CS4 at the fourth incident angle θ2 is re-reflected by the second side surface CS4 without being entered into the light guide unit LG. That is, when the reflective pattern RP are omitted, the light leaked from the light guide unit LG is not re-incident to the light guide unit LG and repeatedly reflected between the intermediate protective member 100M and the light guide unit LG, and thus the light leaked from the light guide unit LG becomes extinct.

The first reflective surface RS1 extended in the third direction DR3 may easily change the path of the light to a direction crossing the direction in which the light travels when viewed in a plan view. The light incident to the first reflective surface RS1 is uniformly incident to the second side surface CS3 without being scattered. To improve the light efficiency, a length in the third direction DR3 of the first reflective surface RS1 is required to be longer than a length in the third direction DR3 of the second side surface CS4.

As described above, the reflective patterns RP reflect the light leaked from the light guide unit LG such that the leaked light is incident to the light guide unit LG, and thus the light efficiency of the display device may be improved. As a result, the display device may reduce power consumption required to drive the backlight unit 300.

A pitch H1 and a width W2 of each of the reflective patterns RP should not be limited to a specific size. That is, a portion of the reflective patterns RP may have different pitch H1 or different width W1 from that of another portion of the reflective patterns RP. In addition, different from the reflective patterns RP shown in FIG. 6, portions of the reflective patterns RP may be disposed to be spaced apart from each other.

Figure 7A:
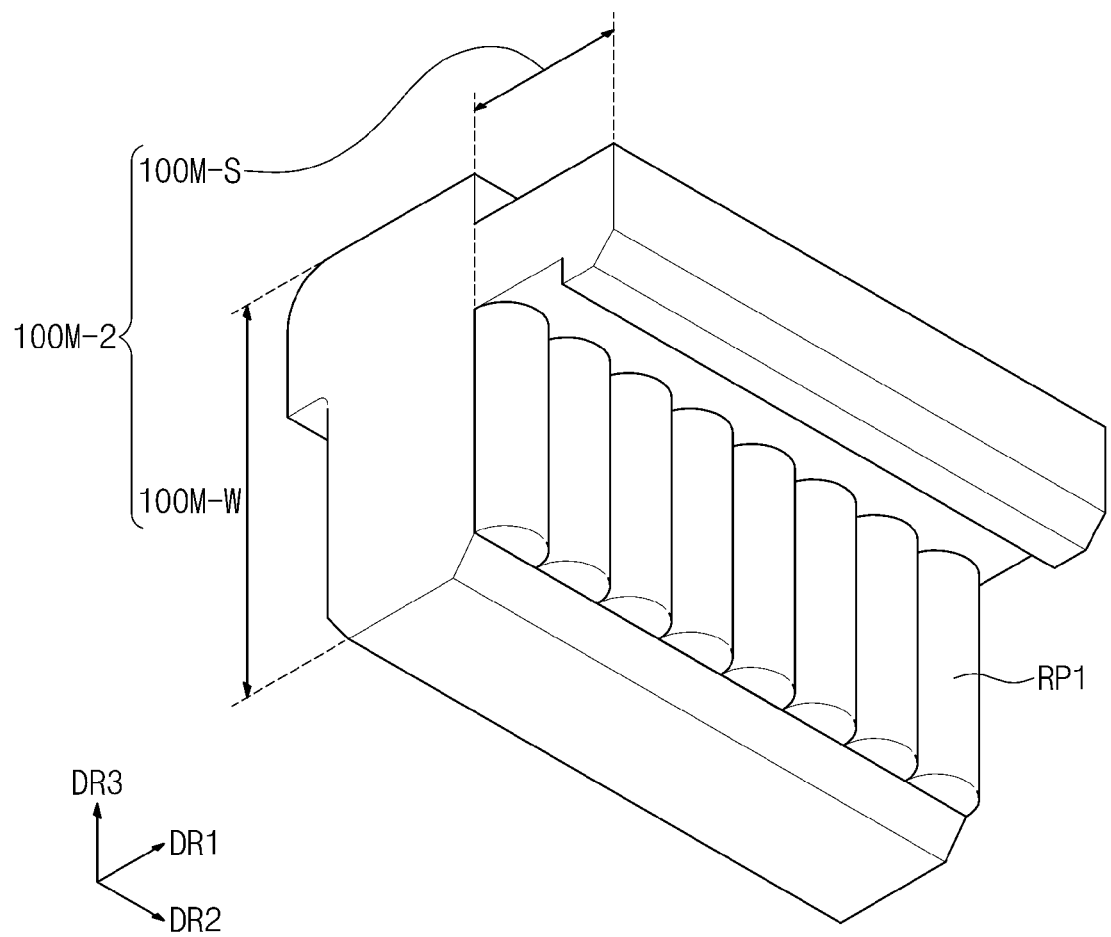
FIG. 7A is a perspective view showing another exemplary embodiment of reflective patterns according to the invention.
Figure 7B:
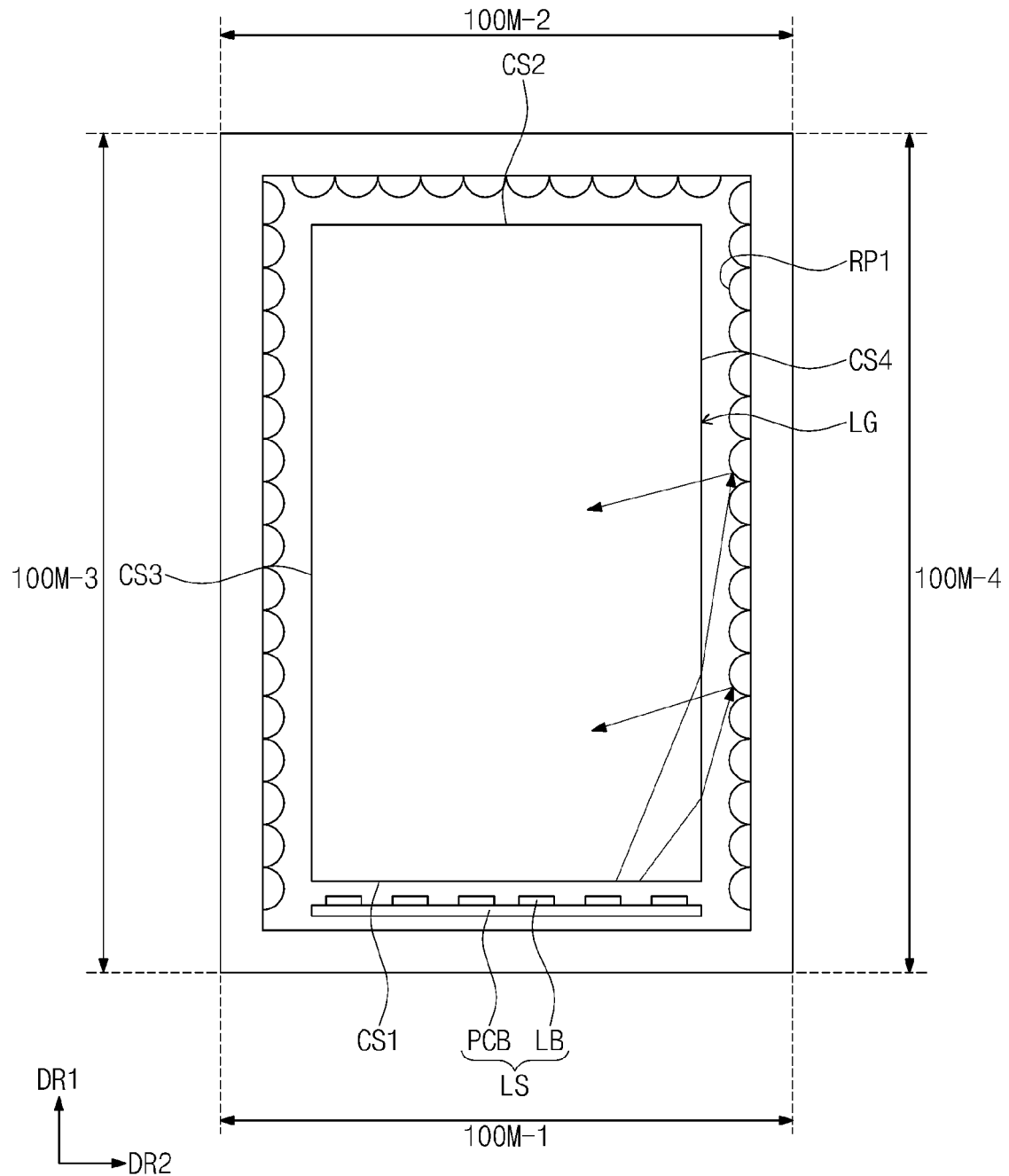
FIG. 7B is a view showing a path of the light reflected by the reflective patterns shown in FIG. 7A.
Figure 8A:
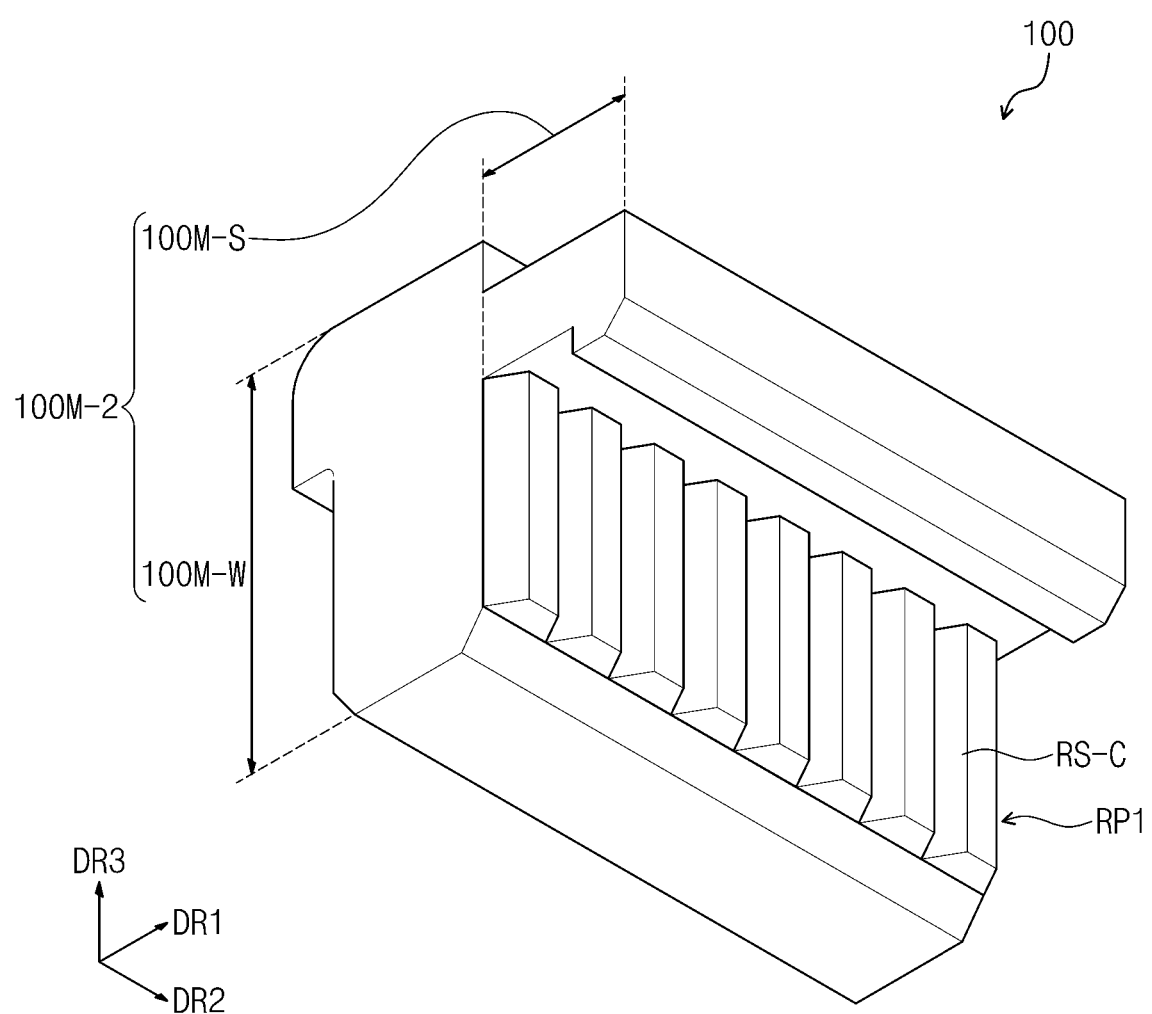
FIG. 8A is a perspective view showing still another exemplary embodiment of reflective patterns according to the invention.
Figure 8B:
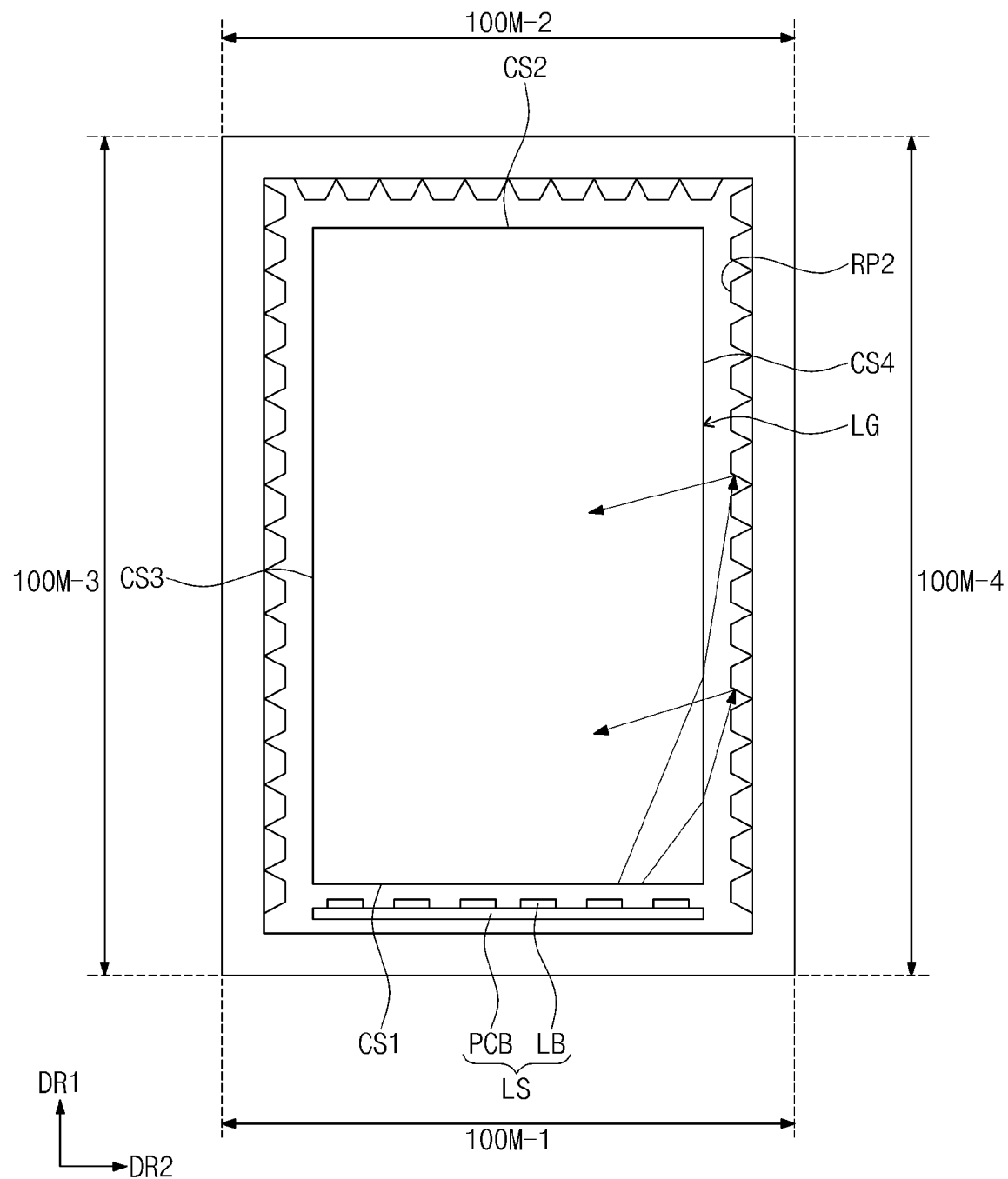
FIG. 8B is a view showing a path of the light reflected by the reflective patterns shown in FIG. 8A.

FIGS. 7A, 7B, 8A and 8B are views showing other exemplary embodiments of reflective patterns according to the invention. In detail, FIGS. 7A and 8A are perspective views showing the reflective patterns and FIGS. 7B and 8B are views showing paths of lights reflected by the reflective patterns in a plan view of the display device.

Referring to FIGS. 7A and 7B, each reflective pattern RP-1 according to the illustrated exemplary embodiment may have a semi-circular cylinder shape in the plan view of the display device. Each reflective pattern RP-1 has a reflective surface RS-C that is curved. Similar to the reflective pattern RP described with reference to FIGS. 4 to 6, the reflective pattern RP-1 reflects the light leaked from the light guide unit LG such that the leaked light is re-incident to the light guide unit LG.

Referring to FIGS. 8A and 8B, each reflective pattern RP-2 according to the illustrated exemplary embodiment may have a polygonal prism shape in the plan view of the display device. FIGS. 8A and 8B show the reflective pattern RP-2 having a trapezoid shape when viewed in a cross-sectional view of the sidewall portion 100M-W, but the invention should not be limited to the trapezoid shape. Similar to the reflective pattern RP described with reference to FIGS. 4 to 6, the reflective pattern RP-2 reflects the light leaked from the light guide unit LG such that the leaked light is re-incident to the light guide unit LG.

Exemplary embodiments of the display device according to the invention may have various shapes other than the shapes of the reflective patterns shown in FIGS. 7B and 8B as long as the reflective pattern has the reflective surface extended in the third direction DR3.

FIGS. 9A to 9E are plan views showing other exemplary embodiments of an arrangement relationship between a light guide unit and reflective patterns according to the invention. Hereinafter, sides of the light guide unit LG, which are indicated on a plane surface, indicate the connecting surfaces.

The display device described with reference to FIGS. 1 to 6 includes one light source LS facing a short side of the light guide unit LG. However, the position of the light source LS may be changed in the display devices shown in FIGS. 9A to 9E. The position of the reflective patterns RP within the display device is changed depending on the position of the light source LS.

Figure 9A:
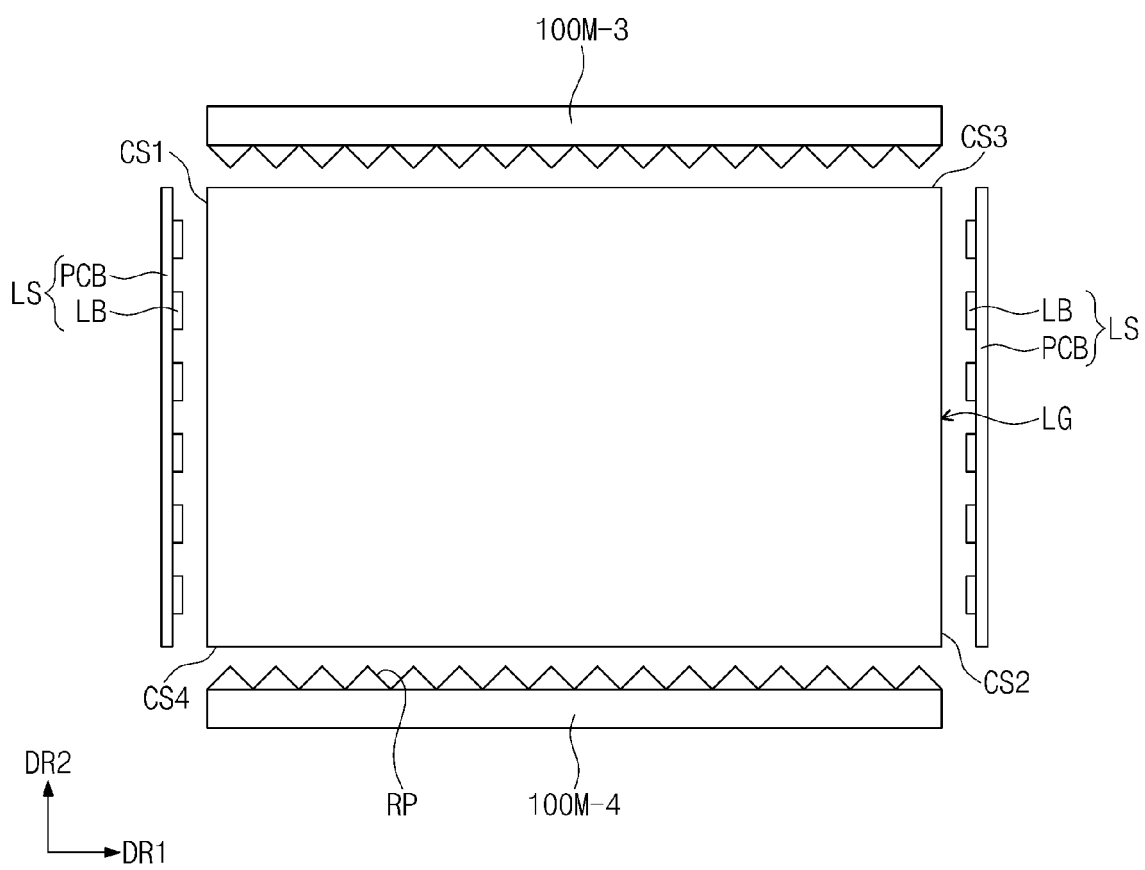
FIGS. 9A to 9E are plan views showing other exemplary embodiments of an arrangement relationship between a light guide unit and reflective patterns according to the invention.

Referring to FIG. 9A, light sources LS may be disposed at positions to correspond to two short sides CS1 and CS2, which face each other, of the light guide unit LG. The reflective patterns RP are disposed at positions to correspond to two long sides CS3 and CS4, which face each other, of the light guide unit LG. In FIG. 9A, two parts 100M-3 and 100M-4, which are separated from each other, of the intermediate protective member 100M have been shown. Although not shown in FIG. 9A, the intermediate protective member 100M may further include other parts to connect the two parts 100M-3 and 100M-4 to each other.

Figure 9B:
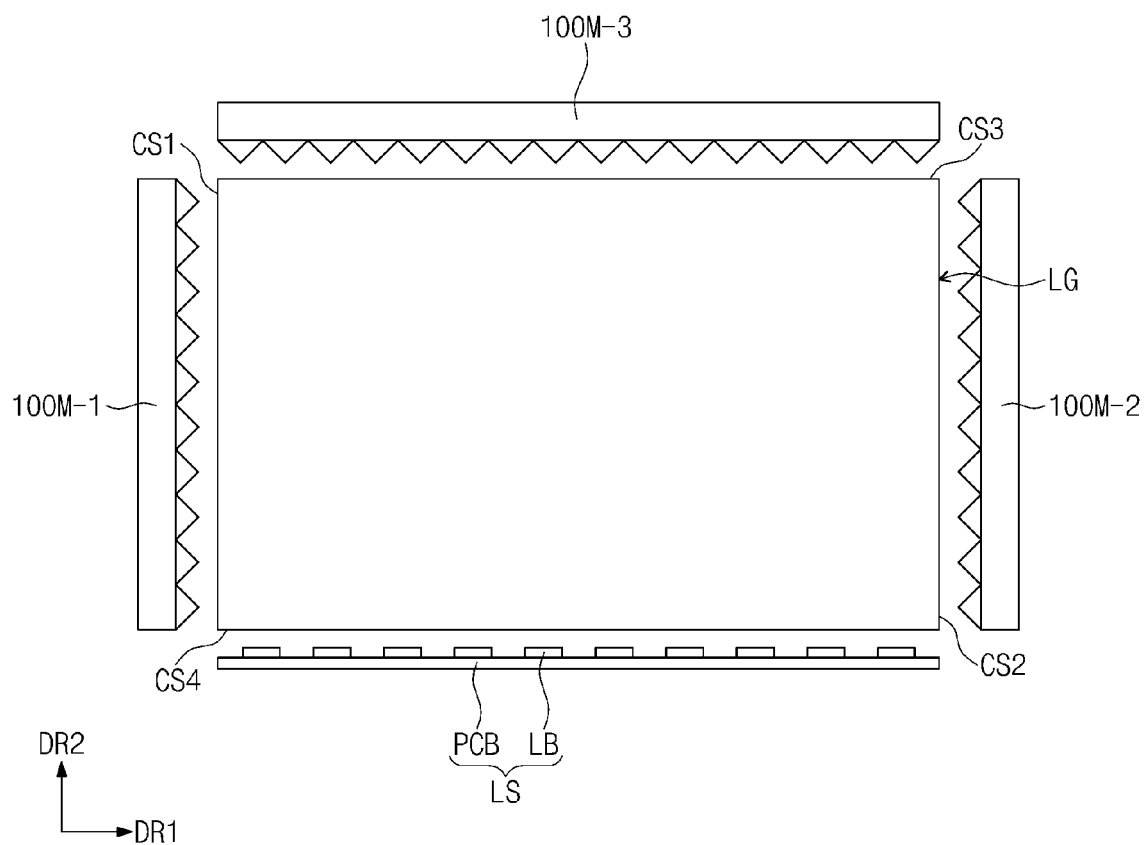

Referring to FIG. 9B, the light sources LS are disposed to correspond to one long side CS4 of the light guide unit LG. The reflective patterns RP are disposed to correspond to the remaining sides CS1, CS2 and CS3 of the light guide unit LG.

Figure 9C:
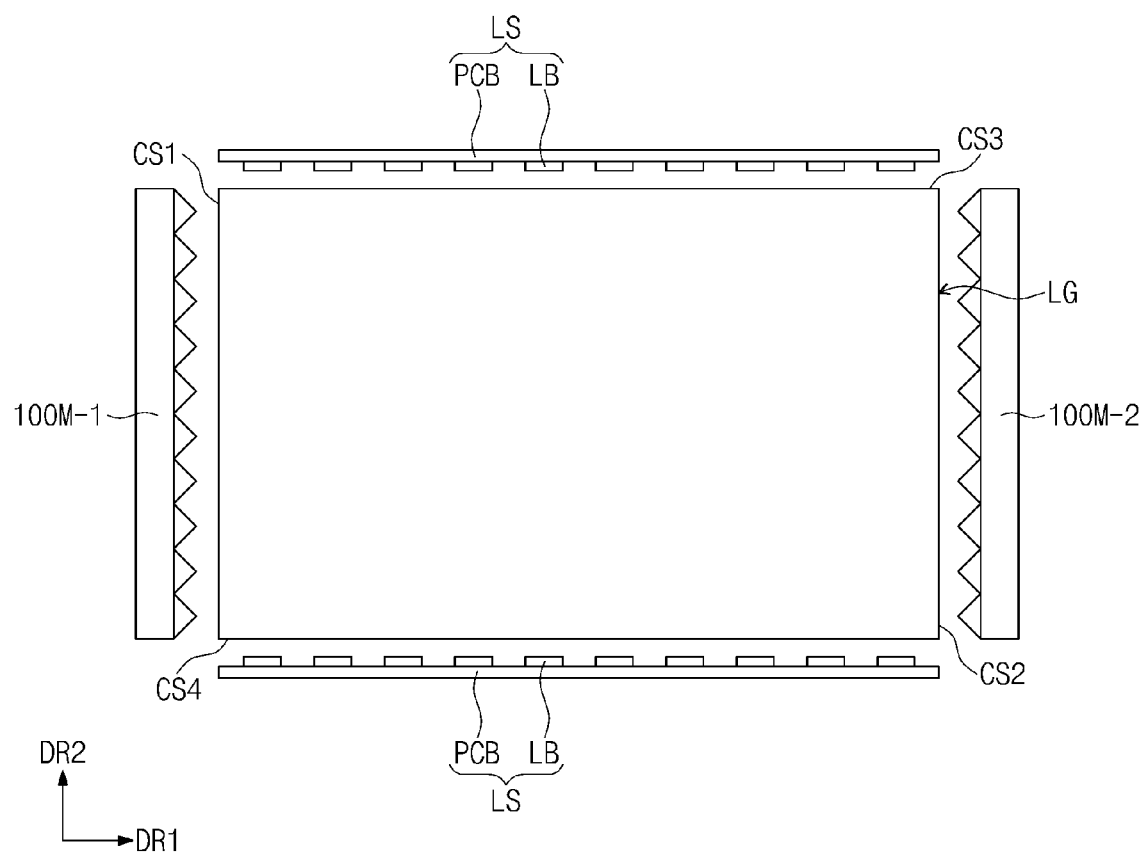

Referring to FIG. 9C, the light sources LS are disposed to correspond two long sides CS3 and CS4, which face each other, of the light guide unit LG. The reflective patterns RP are disposed to correspond to two short sides CS1 and CS2, which face each other, of the light guide unit LG.

Figure 9D:
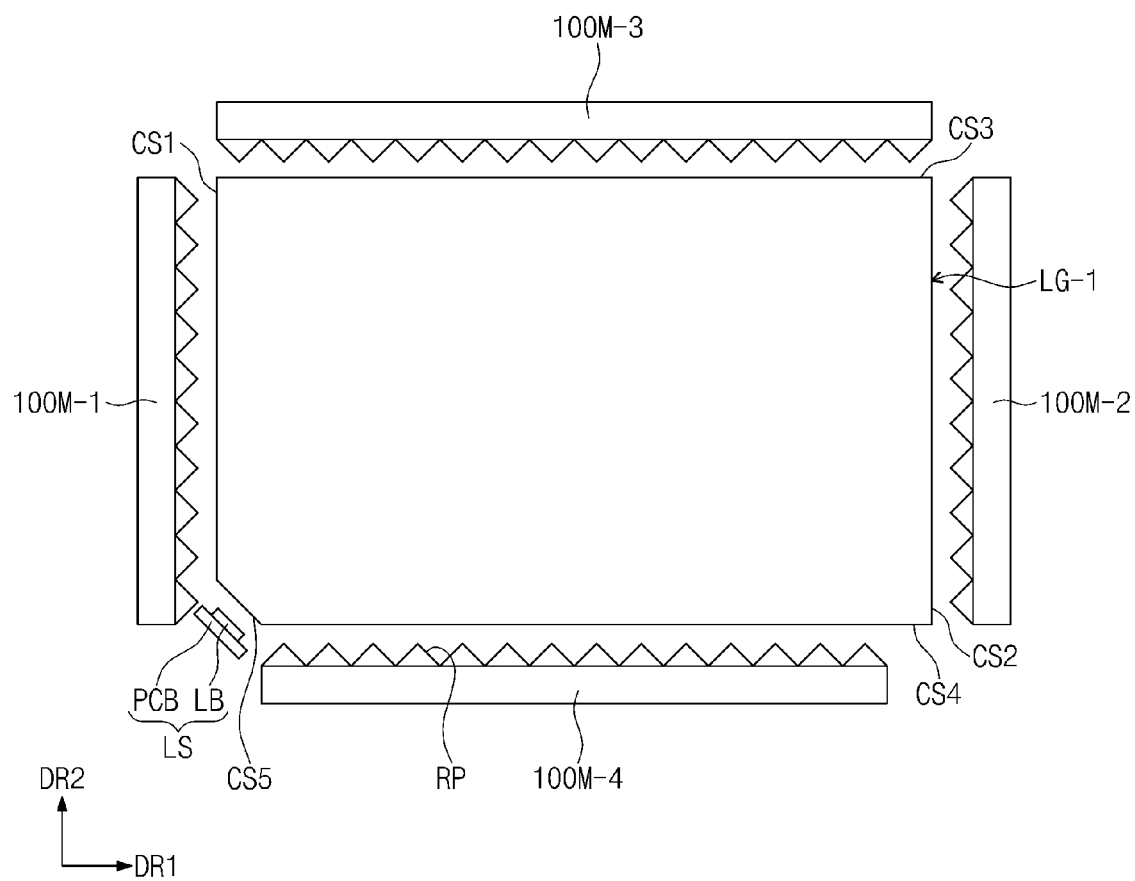
Figure 9E:
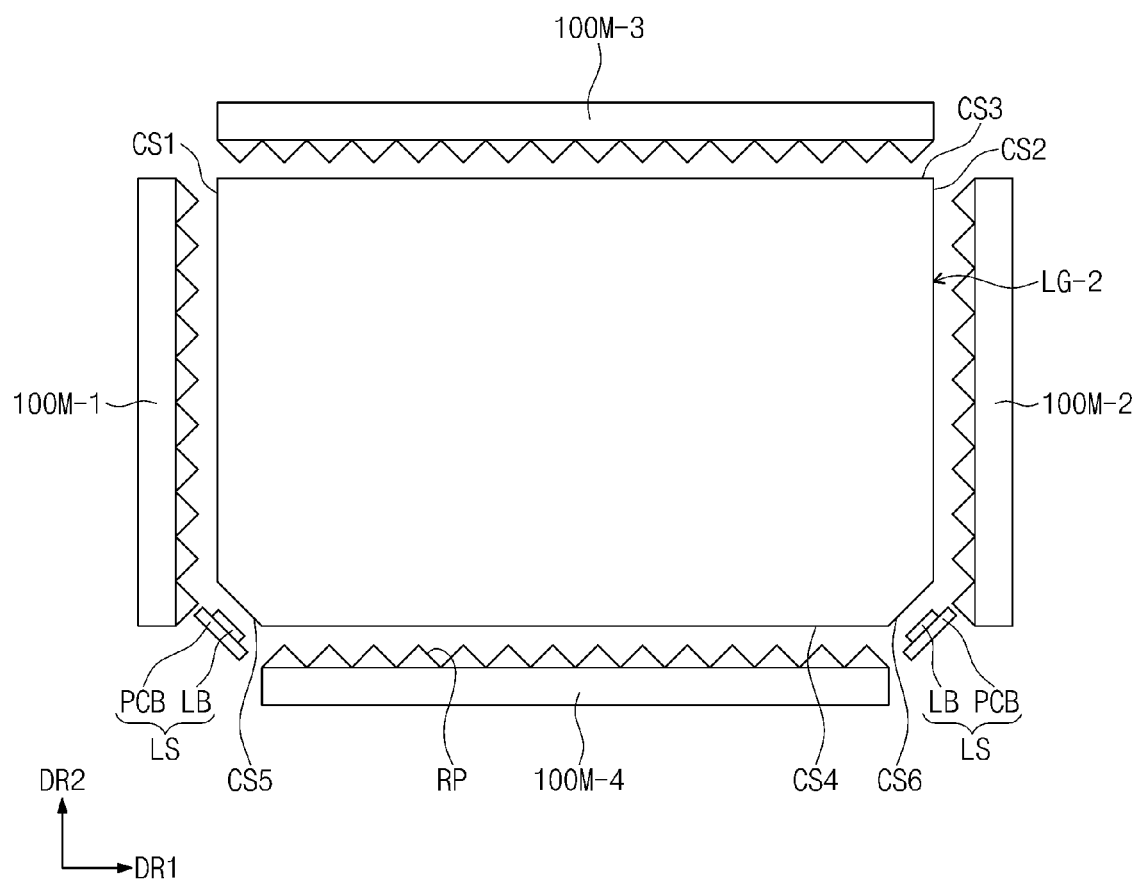

Referring to FIGS. 9D and 9E, the light source LS is disposed at a position adjacent to at least one corner of the light guide unit LG-1 and LG-2. The reflective patterns RP are disposed to correspond to four sides CS1, CS2, CS3 and CS4 of the light guide unit LG-1 and LG-2.

As shown in FIG. 9D, a light guide unit LG-1 includes a diagonal side CS5 disposed between one short side CS1 and one long side CS4 adjacent to each other. That is, a light incident surface is disposed between one connecting surface extended in a first direction DR1 and an adjacent connecting surface extended in a second direction DR2. The reflective patterns RP are disposed to correspond to two short sides CS1 and CS2 and two long sides CS3 and CS4 of the light guide unit LG-1

As shown in FIG. 9E, a light guide unit LG-2 includes a first diagonal side CS5 disposed between one short side CS1 and one long side CS4 adjacent to each other, and a second diagonal side CS6 disposed between the other short side CS2 and the other long side CS4 adjacent to each other. That is, the light guide unit LG-2 includes two light incident surfaces CS5 and CS6.

Figure 10:
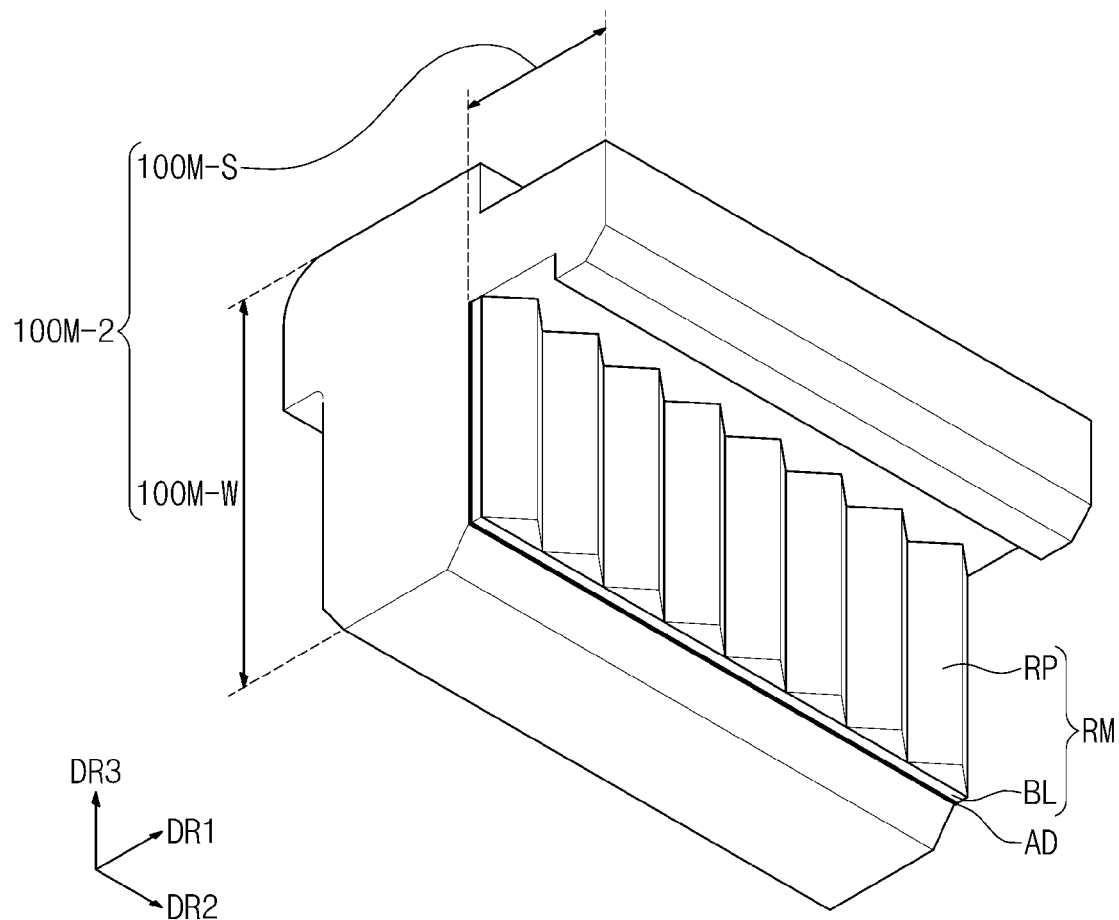
FIG. 10 is a perspective view showing an exemplary embodiment of an intermediate protective member and a reflective member according to the invention.
Figure 11:
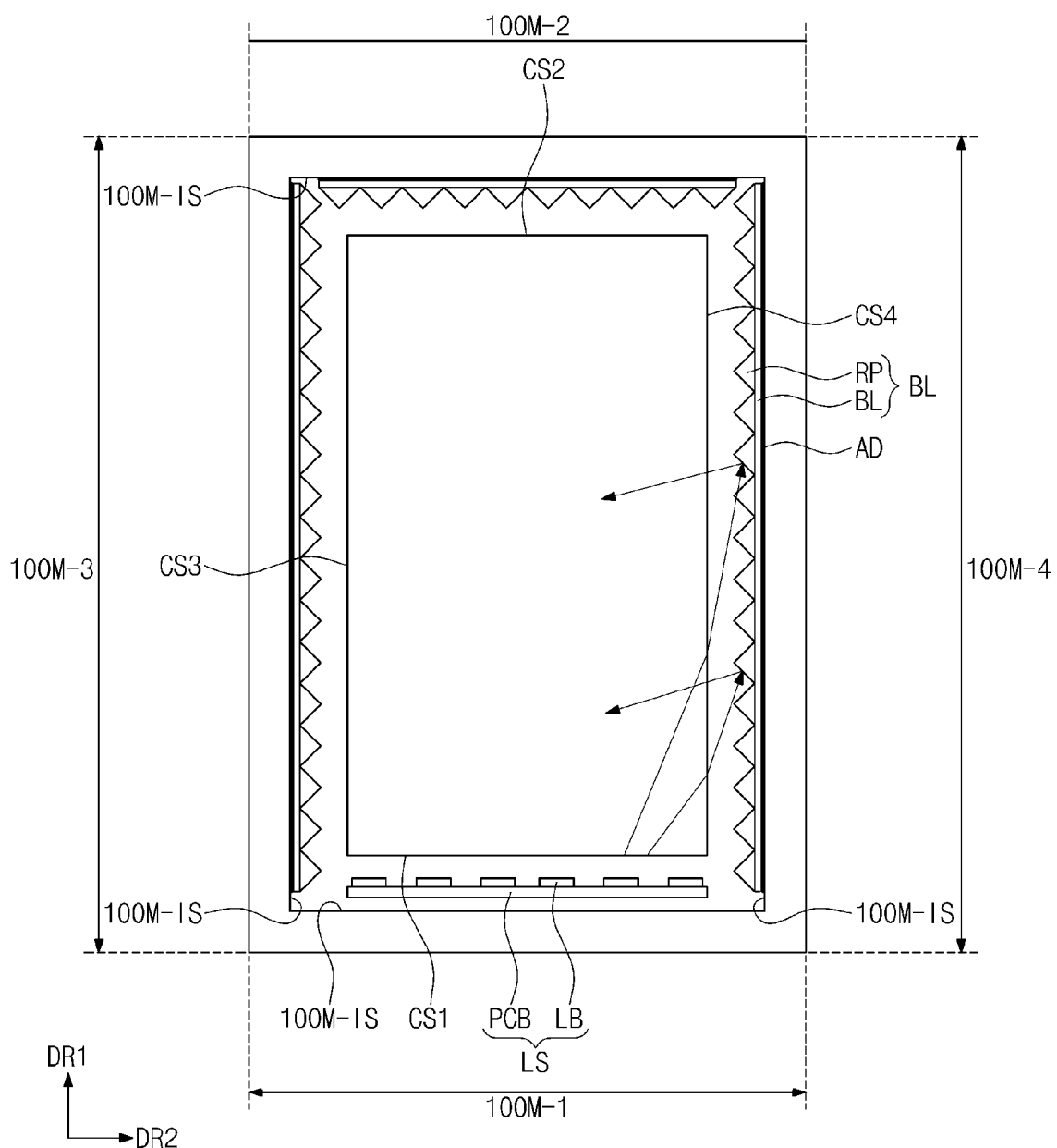
FIG. 11 is a view showing a path of the light reflected by the reflective member shown in FIG. 10.

FIG. 10 is a perspective view showing an exemplary embodiment of an intermediate protective member and a reflective member according to the invention and FIG. 11 is a view showing a path of the light reflected by the reflective member shown in FIG. 10.

Referring to FIGS. 10 and 11, the intermediate protective member 100M includes the sidewall portion 100M-W accommodated in the lower protective member 100L and the support portion 100M-S connected to the sidewall portion 100M-W to support the display panel 200. The sidewall portion 100M-W includes the inner surface 100M-IS facing the connecting surfaces CS1 to CS4 of the light guide unit LG.

The display device according to the illustrated exemplary embodiment includes a reflective member RM coupled to the inner surface 100M-IS of the sidewall portion 100M-W. The reflective member RM includes a base layer BL, and a plurality of reflective patterns RP disposed on the base layer BL. Each of the reflective patterns RP has a prism shape. In an exemplary embodiment, for instance, the reflective member RM may be, but not limited to, a prism sheet manufactured by an injection molding method, but the shape of the reflective patterns RP should not be limited to the prism shape.

Similar to the reflective patterns RP described with reference to FIGS. 4 to 6, the reflective member RM reflects the light leaked from the light guide unit LG such that the leaked light is re-incident to the light guide unit LG. To improve reflectance of the reflective member RM, the reflective member RM may have a white color. In addition, the reflective member RM may include a metal coating layer.

The reflective member RM is coupled to the inner surface 100M-IS of the sidewall portion 100M-W by using a fixing member such as an adhesive AD. Different from the display device described with reference to FIGS. 1 to 6, the reflective member RM is separately manufactured from the intermediate protective member 100M. The reflective member RM and the intermediate protective member 100M may be manufactured using different materials. Therefore, a manufacturing cost of the display device may be reduced.

Although not shown in figures, the arrangements of the light guide unit LG, the light source LS and the reflective member RM of the display device described with reference to FIG. 10 may be changed as described with reference to FIGS. 9A to 9E.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display device comprising:
   a light guide unit which comprises a first surface, a second surface facing the first surface, and a plurality of connecting surfaces connecting the first surface and the second surface to each other, and guides a light which is incident to a connecting surface among the plurality of connecting surfaces, to the first surface;
   a light source which provides light to the connecting surface among the plurality of connecting surfaces;
   a display panel which displays an image using the light provided from the first surface of the light guide unit; and
   a protective member which comprises a plurality of reflective patterns facing another connecting surface among the plurality connecting surfaces, provides the light leaked from the light guide unit to the another connecting surface, and accommodates the light guide unit, the light source and the display panel therein,
   wherein the plurality of reflective patterns is spaced apart from the another connecting surface.

2. The display device of claim 1, wherein the plurality of reflective patterns is extended in a direction normal to the first surface of the light guide unit.

3. The display device of claim 2, wherein a reflective pattern among the plurality of reflective patterns comprises a reflective surface extended in the direction normal to the first surface of the light guide unit, and reflects the light leaked from the light guide unit.

4. The display device of claim 3, wherein the reflective pattern has a prism shape comprising a first reflective surface and a second reflective surface, which form an acute angle.

5. The display device of claim 2, wherein the plurality of reflective patterns is arranged in a direction in which the another connecting surface is extended.

6. The display device of claim 1, wherein the another connecting surface comprises remaining connecting surfaces among the plurality of connecting surfaces, except for the connecting surface to which the incident light is incident.

7. The display device of claim 6, wherein the plurality of connecting surfaces of the light guide unit comprises:
   an incident surface which receives the incident light;
   an opposite surface facing the incident surface and spaced apart from the incident surface; and
   side surfaces connecting the incident surface and the opposite surface to each other,
   wherein the remaining connecting surfaces among the plurality of connecting surfaces comprise the opposite surface and the side surfaces.

8. The display device of claim 6, wherein the plurality of connecting surfaces comprises:
   a first connecting surface;
   a second connecting surface facing the first connecting surface in a first direction of the display device;
   a third connecting surface;
   a fourth connecting surface facing the third connecting surface in a second direction of the display device crossing the first direction; and
   a light incident surface which receives the incident light and connects the first connecting surface and the third connecting surface to each other,
   wherein the remaining connecting surfaces among the plurality of connecting surfaces comprise the first connecting surface, the second connecting surface, the third connecting surface and the fourth connecting surface.

9. The display device of claim 1, wherein the protective member comprises:
   a lower protective member facing the second surface of the light guide unit;
   an intermediate protective member which supports the display panel, partially covers the first surface of the light guide unit, and comprises a sidewall portion facing the another connecting surface; and
   an upper protective member which partially covers the display panel,
   wherein the plurality of reflective patterns are on an inner surface of the sidewall portion of the intermediate protective member.

10. A display device comprising:
    a light source which generates and emits an incident light;
    a light guide unit which comprises a first surface, a second surface facing the first surface, and a plurality of connecting surfaces connecting the first surface and the second surface to each other, and outputs the incident light incident thereto through a connecting surface among the plurality of connecting surfaces, through the first surface;
    a display panel which displays an image using the incident light from the first surface of the light guide unit;
    a protective member which accommodates the light guide unit, the light source and the display panel therein; and a reflective member which faces another connecting surface among the plurality of connecting surfaces, provides light leaked from the light guide unit to the another connecting surface, and is coupled to the protective member,
    wherein the plurality of reflective patterns is spaced apart from the another connecting surface.

11. The display device of claim 10, wherein the reflective member comprises a prism sheet comprising a plurality of prism patterns.

12. The display device of claim 11, wherein the protective member and the prism sheet are coupled to each other by an adhesive.

13. The display device of claim 10, wherein the reflective member comprises a plurality of reflective patterns extended in a direction normal to the first surface of the light guide unit.

14. The display device of claim 13, wherein a reflective pattern among the plurality of reflective patterns comprises a reflective surface extended in the direction normal to the first surface of the light guide unit, and reflects the light leaked from the light guide unit.

15. The display device of claim 13, wherein the plurality of reflective patterns is arranged in a direction in which the another connecting surface is extended.

16. The display device of claim 10, wherein the protective member comprises:
    a lower protective member facing the second surface;
    an intermediate protective member which supports the display panel, partially covers the first surface of the light guide unit, and comprises a sidewall portion facing the another connecting surface; and
    an upper protective member which partially covers the display panel,
    wherein the plurality of reflective patterns is on an inner surface of the sidewall portion of the intermediate protective member.

17. A method of manufacturing a display device, comprising:
- providing a light source which emits light;
- providing a light guide unit comprising a light exiting surface, an opposing surface opposite to the light exiting surface, and a plurality of connecting surfaces connecting the light exiting and opposing surfaces to each other;
- providing a display panel which displays an image using the light provided from the light exiting surface of the light guide unit; and
- providing a frame member which provides light leaked from the light guide unit to a connecting surface among the plurality of connecting surfaces, and comprises:
  - a sidewall portion in which the light guide unit, the light source and the display panel are accommodated and which faces the plurality of connecting surfaces of the light guide unit, and
  - a plurality of reflective patterns on an inner surface of the sidewall portion;
- wherein
- the plurality of connecting surfaces of the light guide unit comprises an incident connecting surface to which the light is incident, and a non-incident connecting surface to which light is not incident, and
- the reflective patterns face the non-incident connecting surface of the light guide unit.

18. The method of claim 16, wherein the plurality of reflective patterns is extended in a direction normal to the first surface of the light guide unit.

\* \* \* \* \*